(12) United States Patent
Asakura et al.

(10) Patent No.: US 7,863,385 B2
(45) Date of Patent: Jan. 4, 2011

(54) VINYL-CIS-POLYBUTADIENE RUBBER AND BUTADIENE RUBBER COMPOSITION USING THE SAME

(75) Inventors: Yoshio Asakura, Chiba (JP); Yasuyoshi Okabe, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 12/714,964

(22) Filed: Mar. 1, 2010

(65) Prior Publication Data

US 2010/0152389 A1   Jun. 17, 2010

Related U.S. Application Data

(62) Division of application No. 10/596,242, filed as application No. PCT/JP2004/018417 on Dec. 2, 2004, now Pat. No. 7,700,691.

(30) Foreign Application Priority Data

| Dec. 12, 2003 | (JP) | 2003-415353 |
| Dec. 12, 2003 | (JP) | 2003-415354 |
| Jan. 13, 2004 | (JP) | 2004-005918 |
| Jan. 23, 2004 | (JP) | 2004-015251 |
| Jan. 23, 2004 | (JP) | 2004-015252 |
| Oct. 18, 2004 | (JP) | 2004-303155 |
| Oct. 18, 2004 | (JP) | 2004-303202 |
| Oct. 18, 2004 | (JP) | 2004-303231 |
| Oct. 18, 2004 | (JP) | 2004-303286 |
| Oct. 18, 2004 | (JP) | 2004-303332 |

(51) Int. Cl.
C08L 9/00 (2006.01)
C08L 25/02 (2006.01)

(52) U.S. Cl. ...... 525/232; 525/241
(58) Field of Classification Search ...... 525/232, 525/241
See application file for complete search history.

(56) References Cited

U.S. PATENT DOCUMENTS

| 3,935,180 | A * | 1/1976 | Sugiura et al. ...... 526/86 |
| 4,196,106 | A | 4/1980 | Matsuura et al. |
| 4,196,406 | A | 4/1980 | Salem |
| 4,421,891 | A | 12/1983 | Miyake et al. |
| 5,468,822 | A | 11/1995 | Tsujimoto et al. |
| 5,559,172 | A | 9/1996 | Kulich et al. |
| 5,580,919 | A | 12/1996 | Agostini et al. |
| 6,211,278 | B1 | 4/2001 | Vanel |
| 6,300,450 | B1 | 10/2001 | Tsujimoto et al. |
| 6,303,692 | B1 | 10/2001 | Luo |
| 6,350,807 | B1 | 2/2002 | Blok et al. |
| 6,664,347 | B2 | 12/2003 | Suzuki et al. |
| 7,700,691 | B2 * | 4/2010 | Asakura et al. ...... 525/191 |
| 2002/0170642 | A1 | 11/2002 | Westermann et al. |
| 2005/0070623 | A1 | 3/2005 | Takase et al. |
| 2007/0155889 | A1 | 7/2007 | Okamoto et al. |

FOREIGN PATENT DOCUMENTS

| EP | 0645424 A1 | 3/1995 |
| EP | 1693411 A1 | 8/2006 |
| JP | 4917666 A1 | 5/1974 |
| JP | 4917667 | 5/1974 |
| JP | 5345347 B2 | 4/1978 |
| JP | 5531802 A | 3/1980 |
| JP | 56109205 A | 8/1981 |
| JP | 57030856 A | 7/1982 |
| JP | 61073707 A | 4/1986 |
| JP | 62171 B2 | 1/1987 |
| JP | 6336324 A1 | 7/1988 |
| JP | 237927 | 8/1990 |
| JP | 238081 | 8/1990 |
| JP | 3045609 A | 2/1991 |
| JP | 363566 | 10/1991 |
| JP | 04085304 A | 3/1992 |
| JP | 448815 B2 | 8/1992 |
| JP | 5194658 A | 8/1993 |
| JP | 6025355 A | 2/1994 |
| JP | 06228370 A | 8/1994 |
| JP | 7315014 A | 12/1995 |
| JP | 8311246 A | 11/1996 |
| JP | 11240981 A | 9/1999 |
| JP | 2000044633 A | 2/2000 |
| JP | 2000256507 A | 9/2000 |

(Continued)

OTHER PUBLICATIONS

"Encyclopedia of Polymers", Sovietskaya entsiklopediya Publishers, vol. 1, pp. 1010, 1012, and 1014 (1972).
"Khimicheskaya Entsiclopediya (Chemical Encyclopaedia—in Russian)"; Bolshaya Rossiyskaya Entsiclopediya Scientific Publishers; Moscow; vol. 4; pp. 183-184; (1995).
Excerpt from Rubber Material Performance and Design Application, Section 4 Polybutadiene Rubber, pp. 17-19 (2003) (with English abstract).

(Continued)

*Primary Examiner*—Nathan M Nutter
(74) *Attorney, Agent, or Firm*—Panitch Schwarze Belisario & Nadel LLP

(57) ABSTRACT

A vinyl•cis-polybutadiene rubber is provided containing 1,2-polybutadiene and a polymer substance of a melting point lower than that of the 1,2-polybutadiene and with at least one unsaturated double bond per repeating unit, where the 1,2-polybutadiene and the polymer substance are dispersed at physically and/or chemically adsorbed states in the cis-polybutadiene rubber as the matrix component of the vinyl•cis-polybutadiene rubber, and a method for producing the same, to provide a vulcanized product exerting a small die swell ratio and excellent extrusion processability and operability, as well as very great characteristics demanded for the side tread of tire and the like.

8 Claims, 4 Drawing Sheets

FOREIGN PATENT DOCUMENTS

| | | |
|---|---|---|
| JP | 2001294614 A | 10/2001 |
| JP | 2001302730 A | 10/2001 |
| JP | 2002338740 A | 11/2002 |
| JP | 2003041064 A | 2/2003 |
| JP | 200459740 A | 2/2004 |
| JP | 2004244427 A | 9/2004 |
| JP | 20058817 A | 1/2005 |
| JP | 2005206702 A | 8/2005 |
| KP | 199634289 A | 10/1996 |
| KP | 20010111018 A | 12/2001 |
| RU | 2214427 C2 | 10/2003 |
| TW | 442523 B | 6/2001 |
| TW | 467942 B | 12/2001 |
| TW | 475938 B | 2/2002 |
| TW | 562817 B | 11/2003 |
| WO | 03040231 A1 | 5/2003 |

OTHER PUBLICATIONS

Indian Office Action issued Jun. 16, 2010 in counterpart Indian Application No. 3100/DELNP/2006.
European Office Action issued Aug. 31, 2010 in European Patent Application No. 05 820 043.7-1214.
patent documents, the indication of the year of the reign of appropriate symbols as indicated on the document under Wipo is attached. Efs Web 2.1.17.

* cited by examiner

VINYL-CIS-POLYBUTADIENE RUBBER AND BUTADIENE RUBBER COMPOSITION USING THE SAME

CROSS-REFERENCE TO RELATED APPLICATIONS

This application is a divisional of U.S. application Ser. No. 10/596,242 which was filed Jun. 6, 2006, which is a section 371 of International Application No. PCT/JP2004/018417, filed Dec. 2, 2004, which was published in the Japanese language on Jun. 23, 2005, under International Publication No. WO 2005/056663 and the disclosure of which is incorporated herein by reference.

BACKGROUND OF THE INVENTION

The present invention relates to a novel vinyl•cis-polybutadiene rubber produced by concurrently allowing 1,2-polybutadiene of a high melting point of 170° C. or more and polyisoprene or polybutadiene of a low melting point to exist and be dispersed in the matrix of cis-polybutadiene rubber. Further, the invention relates to a butadiene rubber composition using the vinyl•cis-polybutadiene rubber.

In the molecular chain of polybutadiene, a binding portion generated by 1,4 polymerization (1,4 structure) and a binding portion generated by 1,2 polymerization (1,2 structure) concurrently exist as so-called microstructure. The 1,4 structure is divided in two types of structures, namely cis structure and trans structure. Alternatively, the 1,2 structure takes a structure with vinyl group as a side chain.

A method for producing vinyl•cis-polybutadiene rubber composition in the related art has been carried out in inert organic solvents such as aromatic hydrocarbons such as benzene, toluene and xylene and halogenated hydrocarbons thereof for example chlorobenzene. When solvents such as aromatic hydrocarbons and halogenated hydrocarbons are used, however, the resulting polymerization solution has such a high viscosity that the agitation, heat transmission and transfer thereof are troublesome, which requires excessive energy for the recovery of such solvent. Additionally, solvents such as aromatic hydrocarbons and halogenated hydrocarbons are very hazardous for environment, due to the toxicity and carcinogenesis.

As the production method, a method including a step of producing cis-polybutadiene rubber by cis-1,4 polymerization of 1,3-butadiene using a catalyst obtained from water, a soluble cobalt compound and an organic aluminum chloride represented by the general formula $AlR_nX_{3-n}$ (provided that R is an alkyl group with one to 6 carbon atoms, phenyl group or cycloalkyl group; X is a halogen element; and n is a numerical figure of 1.5 to 2) in the inert organic solvent, and a step of syndiotactic 1,2 polymerization (abbreviated as "1,2 polymerization" hereinafter) of 1,3-butadiene in the presence of a syndiotactic 1,2 polymerization catalyst obtained from a soluble cobalt compound, an organic aluminum compound represented by the general formula $AlR_3$ (provided that R is an alkyl group with one to 6 carbon atoms, phenyl group or cycloalkyl group) and carbon disulfide, with addition or no addition of 1,3-butadiene and/or the solvent to the resulting polymerization system is known (see for example JP-B-49-17666 (patent reference 1) and JP-B-49-17667 (patent reference 2)).

Additionally, for example, JP-B-62-171 (patent reference 3), JP-B-63-36324 (patent reference 4), JP-B-2-37927 (patent reference 5), JP-B-2-38081 (patent reference 6), and JP-B-3-63566 (patent reference 7) describe methods including a step of producing vinyl-cis-polybutadiene rubber composition by cis-1,4 polymerization of 1,3-butadiene in the presence or absence of carbon disulfide, and methods including a step of separating and recovering 1,3-butadiene and carbon disulfide to recycle 1,3-butadiene substantially never containing carbon disulfide and the inert organic solvent. Further, JP-B-4-48815 (patent reference 8) describes a rubber composition with a small die swell ratio of compounded material, of which the vulcanized product has an excellent tensile strength and a great flex-crack-growth resistance preferable as the sidewall of tire.

Additionally, JP-A-2000-44633 (patent reference 9) describes a method for producing vinyl•cis-polybutadiene rubber in an inert organic solvent containing $C_4$ distillates such as n-butane, cis-2-butene, trans-2-butene, and butene-1 as the main components. JP-A-2000-44633 describes that 1,2-polybutadiene contained in the rubber composition according to the method is a crystal in short fiber, where 98% or more of the fiber length is less than 0.6 μm in the distribution of the crystal in short fiber along major axis; and 70% or more thereof is less than 0.2 μm and that the resulting rubber composition has improved moldability of cis-1,4-polybutadiene, tensile stress, tensile strength and flex-crack-growth resistance.

However, a rubber composition with improved various properties has been demanded for some use.

BRIEF SUMMARY OF THE INVENTION

It is an object of the invention to provide vinyl•cis-polybutadiene rubber giving a butadiene rubber composition with a small die swell ratio and excellent extrusion processability and operability for producing tire, which exerts excellent break-resistant properties, abrasion resistance and sliding friction resistance as well as very great flex-crack-growth resistance and high rigidity, when the butadiene rubber composition is vulcanized. It is an object of the invention to provide a butadiene rubber composition with the excellent properties, particularly a butadiene rubber composition for tire.

The invention has achieved the objects via the following constitutions.

1. A vinyl•cis-polybutadiene rubber containing 1,2-polybutadiene and a polymer substance with a melting point lower than that of the 1,2-polybutadiene and with at least one unsaturated double bond per repeating unit, where the 1,2-polybutadiene and the polymer substance are dispersed at physically and/or chemically adsorbed states in the cis-polybutadiene rubber as the matrix component of the vinyl•cis-polybutadiene rubber.

2. The vinyl•cis-polybutadiene rubber described in 1. above, where the 1,2-polybutadiene and the polymer substance are dispersed in short crystal fiber and/or particle in the cis-polybutadiene rubber as the matrix component of the vinyl•cis-polybutadiene rubber.

3. The vinyl•cis-polybutadiene rubber described in 1. or 2. above, where the 1,2-polybutadiene is 1,2-polybutadiene of a melting point of 170° C. or more and the polymer substance is at least one selected from polyisoprene, crystallizable polybutadiene of a melting point of 150° C. or less, liquid polybutadiene and derivatives thereof.

4. The vinyl•cis-polybutadiene rubber described in any of 1. through 3. above, where the unsaturated polymer substance is contained within a range of 0.01 to 50% by mass to the total of the crystal fiber of the 1,2-polybutadiene and cis-polybutadiene rubber.

5. The vinyl•cis-polybutadiene rubber described in any of 1. through 4., where the viscosity of the cis-polybutadiene rubber as the matrix component in toluene solution at 25° C. is within a range of 10 to 150.

6. The vinyl-cis-polybutadiene rubber described in any of 1. through 5., where [η] of the cis-polybutadiene rubber as the matrix component is within a range of 1.0 to 5.0.

7. The vinyl•cis-polybutadiene rubber described in any of 1. through 6., where the content of the 1,4-cis structure of the cis-polybutadiene rubber as the matrix component is within a range of 80% by mass or more.

8. The vinyl•cis-polybutadiene rubber described in any of 1. through 7. above, where the Mooney viscosity of the cis-polybutadiene rubber as the matrix component of the vinyl•cis-polybutadiene rubber is within a range of 10 to 50.

9. The vinyl•cis-polybutadiene rubber described in any of 1. through 8., where the polymer substance is a matter insoluble in boiling n-hexane.

10. The vinyl-cis-polybutadiene rubber described in any of 1. through 9., where the 1,2-polybutadiene is dispersed in short crystal fiber in the cis-polybutadiene rubber as the matrix component of the vinyl-cis-polybutadiene rubber and the polymer substance is dispersed in particle therein, and where the short crystal fiber of the 1,2-polybutadiene is dispersed in the particle of the polymer substance.

11. The vinyl•cis-polybutadiene rubber described in 10 above, where the short crystal fiber of the 1,2-polybutadiene is never contained in the particle of the polymer substance but is also dispersed in the cis-polybutadiene rubber as the matrix component, and where the length of the short crystal fiber dispersed in the matrix along major axis is within a range of 0.2 to 1,000 μm and the length of the short crystal fiber of the 1,2-polybutadiene dispersed in the particle of the polymer substance along major axis is within a range of 0.01 to 0.5 μm.

12. A butadiene rubber composition prepared by compounding the vinyl-cis-polybutadiene rubber described in 1. or 2. above at 10 to 300 parts by weight per 100 parts by weight of a rubber selected from natural rubber, polyisoprene rubber, styrene-butadiene copolymer rubber, or a blend rubber of at least two types thereof.

13. A butadiene rubber composition for tire, where the vinyl•cis-polybutadiene rubber described in 1. through 11. above, and/or the butadiene rubber composition described in 12. above is used.

14. A method for producing vinyl-cis-polybutadiene rubber by a step of the cis-1,4 polymerization of 1,3-butadiene using a cis-1,4 polymerization catalyst in a hydrocarbon-series solvent, a step of the 1,2 polymerization of 1,3-butadiene in the concurrent presence of a 1,2 polymerization catalyst in the resulting polymerization mixture to generate 1,2-polybutadiene of a melting point of 170° C. or more, and a step of the separation and recovery of vinyl•cis-polybutadiene rubber generated from the resulting polymerization mixture, the method including a step of adding a polymer substance with at least one unsaturated double bond per repeating unit to the production system of vinyl-cis-polybutadiene rubber.

15. The method for producing vinyl•cis-polybutadiene rubber as described in 14. above, where the polymer substance is at least one selected from polyisoprene, crystallizable polybutadiene of a melting point of 0° C. to 150° C., liquid polybutadiene, and derivatives thereof.

16. The method for producing vinyl•cis-polybutadiene rubber as described in 14. or 15. above, where the amount of the polymer substance to be added to the production system is within a range of 0.01 to 50% by mass to the vinyl•cis-polybutadiene rubber to be obtained.

17. The method for producing vinyl•cis-polybutadiene rubber as described in any of 14. through 16. above, where the step of adding the polymer substance to the production system is carried out in the polymerization mixture at an appropriate time point from the step of the cis-1,4 polymerization step to the step of the separation and recovery of the vinyl•cis-polybutadiene rubber generated from the polymerization mixture obtained after the completion of the 1,2 polymerization.

18. The method for producing vinyl•cis-polybutadiene rubber as described in any of 14. through 17. above, where the hydrocarbon-series solvent is a hydrocarbon-series solvent with a solubility parameter of 9.0 or less.

19. A butadiene rubber composition prepared by compounding the vinyl•cis-polybutadiene rubber obtained by the production method described in any of 14. through 18. above at 10 to 300 parts by mass per 100 parts by mass of a rubber selected from natural rubber, polyisoprene rubber, styrene-butadiene copolymer rubber or a blend rubber of at least two types thereof.

20. A butadiene rubber composition for tire, where the vinyl•cis-polybutadiene rubber obtained by the production method described in any of 14. through 18. above and/or the butadiene rubber composition described in 12, 13 or 19 above is used.

In a preferable embodiment, the vinyl•cis-polybutadiene rubber of the invention (abbreviated as "VCR" hereinafter) is a novel VCR where the 1,2-polybutadiene is 1,2-polybutadiene of a melting point of 170° C. or more, where the polymer substance of a melting point lower than that of the 1,2-polybutadiene and with at least one unsaturated double bond per repeating unit (sometimes abbreviated as "unsaturated polymer substance" hereinafter) is at least one selected from polyisoprene, crystallizable polybutadiene of a melting point less than 170° C., liquid polybutadiene and derivatives thereof, and where the 1,2-polybutadiene of a melting point of 170° C. or more and the unsaturated polymer substance are present concurrently in the matrix of cis-polybutadiene rubber and are dispersed therein.

Owing to the concurrent presence of 1,2-polybutadiene of a high melting point exerting very strong interaction between polymers as a very excellent reinforcing component and such unsaturated polymer substance with a relatively low melting point such as polyisoprene, consequently, the VCR in accordance with the invention has remarkably improved dispersibility of the 1,2-polybutadiene of a high melting point in the cis-polybutadiene rubber as the matrix component due to the compatible effect of the concurrently present unsaturated polymer substance, compared with the VCR in the related art, so that the content of the 1,2-polybutadiene of a high melting point as an excellent reinforcing component can be raised.

The characteristics of the VCR in accordance with the invention as described above enable great improvement of various physico-chemical properties strongly demanded in the production of tire articles and in other uses. When the VCR of the invention is used in a butadiene rubber composition for tire, in particular, the composition has such a small die swell ratio (as the ratio of the diameter of the compounded material to die orifice diameter during extrusion) during tire production, so that the composition exerts great extrusion processability and operability. Additionally, the vulcanized product of the composition exerts excellent break-resistant properties, abrasion resistance, sliding friction resistance and the like mainly required for side tread of tire and the like. Because the flex-crack-growth resistance thereof is very great and the rigidity thereof is high, further, the amount of reinforcing materials such as carbon and silica to be used can be reduced, enabling low fuel consumption owing to the weight decrease of tire. Thus, tire using the VCR of the invention as a raw material for side treads and the like exerts excellent running stability and high-speed durability and additionally enables low fuel consumption.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
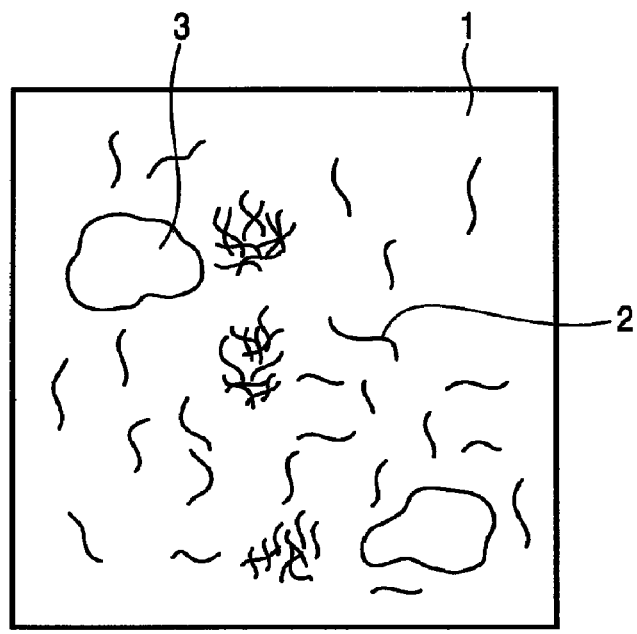
FIG. 1 is one schematic view of a dispersion embodiment of the unsaturated polymer substance in relation to the crystal fiber of the 1,2-polybutadiene of a melting point of 170° C. or more.

In the figures, symbol "1" expresses matrix; "2", the crystal fiber of the 1,2-polybutadiene of a melting point of 170° C. or more; "3", the microparticle of unsaturated polymer substance.

DETAILED DESCRIPTION OF THE INVENTION

The VCR of the invention generally has the following constitution. Specifically, the VCR generally contains (1) one to 50 parts by mass of 1,2-polybutadiene of a melting point of 170° C. or more; (2) 100 parts by mass of cis-polybutadiene rubber and (3) an unsaturated polymer substance at 0.01 to 50% by mass of the total of (1) and (2). Additionally, the 1,2-polybutadiene of a melting point of 170° C. or more as the component (1) generally forms a crystal fiber with the mean length of the mono-dispersed fiber crystal along short axis being 0.2 μm or less and an aspect ratio being 10 or less, which is in a short fiber form with the mean number of the mono-dispersed fiber crystal being 10 or more.

The crystal fiber of the 1,2-polybutadiene as the component (1) is in a short fiber form of the mean length of the mono-dispersed fiber crystal along short axis being 0.2 μm or less, preferably 0.1 μm or less; with an aspect ratio of 10 or less, preferably 8 or less; and with the mean number of the mono-dispersed fiber crystal being 10 or more, preferably 15 or more, and additionally of a melting point of 170° C. or more, preferably 190 to 220° C.

The cis-polybutadiene rubber as the component (2) preferably has the following characteristics. In other words, the cis-polybutadiene rubber as the component (2) has a Mooney viscosity ($ML_{1+4}$ 100° C. abbreviated as "ML" hereinafter) of preferably 10 to 50, more preferably 10 to 40. In such manner, effectively, the operability during compounding is improved, while the dispersion of the component (1) in the component (2) is improved. Additionally, the cis-polybutadiene rubber as the component (2) has preferably the following characteristics. In other words, the viscosity thereof in toluene solution (centipoise/25° C. abbreviated as "T-cp" hereinafter) is preferably 10 to 150, more preferably 10 to 100; and [η] (intrinsic viscosity) is 1.0 to 5.0, preferably 1.0 to 4.0. Additionally, the content ratio of the 1,4-cis structure is 80% by mass or more, preferably 90% by mass or more. Additionally, the cis-polybutadiene rubber as the component (2) substantially never contains gel matters. Herein, the phrase "substantially never containing gel matters" means that toluene-insoluble matters are at 0.5% by mass or less.

The end and/or main chain of the polybutadiene rubber obtained by the cis-1,4 polymerization may be modified. As such modifier, organic silicone compounds containing at least amino group and alkoxy group, organic silicone compounds containing alkoxy group, unsaturated carboxylic acid or derivatives thereof, halogen-series compounds, and compounds with hetero-three membered-rings may be used. The amount of such modifier to be used is 0.01 to 150 mmol per 100 g of the generated polybutadiene (polybutadiene rubber). When the amount of the modifier to be used is less, the modification effect is hardly exerted. When the amount thereof to be used is too much, the modifier still unreactive is likely to remain in polybutadiene. It requires laborious works to eliminate the modifier, unpreferably. Herein, the Mooney viscosity of the modified product is preferably increased by one or more, compared with the original rubber before modification. So as to promote the reaction, organic peroxides can be added. Preferably, the modified polybutadiene obtained by the method has a Mooney viscosity ($ML_{1+4}$, 100° C.) within a range of 20 to 80 and has a weight average molecular weight of 200,000 to 1,000,000 by gel permeation method, where 80% by mass or more of the repeating unit has cis-1,4 structure. Additionally, the content of the vinyl structure in the microstructure is preferably 15% by mass or less.

Herein, the toluene-insoluble matters express gel matters attached on a metal net after filtration, by completely dissolving 10 g of a sample rubber and 400 ml of toluene in an Erlenmeyer flask at RT (25° C.) and filtering the resulting solution, using a filtration device arranged with the metal net of 200 mesh. The ratio expresses a value measured by drying the net attached with the gel in vacuum to measure the attached amount thereof to calculate the percentage to the sample rubber.

Additionally, [η] (intrinsic viscosity) is a value determined according to the following formula, by placing 0.1 g of a sample rubber and 100 ml of toluene in an Erlenmeyer flask, completely dissolving the sample rubber at 30° C., subsequently placing the solution of 10 ml in a Canon Fenske dynamic viscometer in a thermostat water bath controlled at 30° C., and measuring the drop time (T) of the solution.

$$\eta sp = T/T_0 - 1$$

($T_0$: drop time of toluene alone)

$$\eta sp/c = [\eta] + k'[\eta]^2 C$$

($\eta sp$: specific viscosity; k':Huggins constant (0.37); C: sample concentration (g/ml))

The ratio between the 1,2-polybutadiene crystal fiber as the component (1) and the cis-polybutadiene as the component (2) is one to 50 parts by mass, preferably one to 30 parts by mass of the 1,2-polybutadiene crystal fiber as the component (1) to 100 parts by mass of the cis-polybutadiene as the component (2). Within the range, the following drawbacks can be avoided: when the amount of the 1,2-polyutadiene crystal fiber is so large to exceed 50 parts by mass, the short fiber crystal of the 1,2-polybutadiene crystal fiber in the cis-polybutadiene rubber is likely to be large, causing poor dispersibility thereof; when the amount of the 1,2-polyutadiene crystal fiber is small less than one part by mass, the reinforcibility with the short fiber crystal is deteriorated. Thus, problems hardly occur, such that the characteristic elastic modulus, flex-crack-growth resistance, and oxidation degradation are exerted with difficulty and the processability is deteriorated. Therefore, the range is preferable. Further, the ratio of the unsaturated polymer substance as the component (3) is 0.01 to 50% by mass, preferably 0.01 to 30% by mass of VCR, as described above. The range is preferable because the deterioration of the dispersibility due to the aggregation of the 1,2-polybutadiene crystal fiber as the component (1) can be suppressed, and an associated deterioration of the various physico-chemical properties of VCR can be suppressed.

Further, the ratio of the 1,2-polybutadiene of a melting point of 170° C. or more as the component (1) and the unsaturated polymer substance as the component (3) is 0.02 to 100 parts by mass, preferably 0.05 to 80 parts by mass of the component (3) per 100 parts by mass of the component (1). Additionally, the total amount of the components (1) and (3) is 1.01 to 100 parts by mass, preferably 1.03 to 90 parts by mass per 100 parts by mass of the cis-polybutadiene rubber as the component (2).

The method for producing VCR in accordance with the invention is described below in detail.

For the VCR production in accordance with the invention, generally, 1,3-butadiene is polymerized, using a hydrocarbon-series solvent. The hydrocarbon-series solvent is preferably a hydrocarbon-series solvent with a solubility parameter (abbreviated as "SP value" hereinafter) of 9.0 or less and is more preferably a hydrocarbon-series solvent with a solubility parameter of 8.4 or less. The hydrocarbon-series solvent with a solubility parameter of 9.0 or less includes for example aliphatic hydrocarbons and alicyclic hydrocarbons, such as n-hexane (SP value: 7.2), n-pentane (SP value: 7.0), n-octane (SP value: 7.5), cyclohexane (SP value: 8.1) and n-butane (SP value: 6.6). Among them, for example, cyclohexane is preferable.

The SP values of these solvents are known in references such as Rubber Industry Manual (Gomu Kogyo Binran) (the 4th edition, Nippon Rubber Association Foundation (Nippon Gomu Kyokai), issued on Jan. 20, 1994, page 721).

By using a solvent with an SP value smaller than 9.0, preferably, the dispersion of the short fiber crystal of the 1,2-polybutadiene crystal fiber in the cis-polybutadiene rubber is at a state expected in accordance with the invention, so that excellent die swell characteristic, high tensile stress, tensile strength and high flex-crack-growth performance can be preferably exerted.

First, 1,3-butadiene and the solvent are mixed together, to adjust the concentration of water in the resulting solution. Water is within a range of preferably 0.1 to 1.0 mole, particularly preferably 0.2 to 1.0 mole per one mole of an organic aluminum chloride used as the cis-1,4 polymerization catalyst in the solution. The range is preferable because sufficient catalytic activity can be obtained to provide a preferable content and molecular weight of cis-1,4 structure and because gel occurrence during polymerization can be suppressed, to prevent gel adhesion onto polymerization tanks or the like, so that continuous polymerization time can be prolonged. As the method for adjusting water concentration, known methods are applicable. A method of addition and dispersion through porous filters (JP-A-4-85304) is effective.

To the solution obtained by adjusting water concentration is added an organic aluminum chloride as one of cis-1,4 polymerization catalysts. As such organic aluminum chloride, a compound represented by the general formula $AlR_nX_{3-n}$ is preferably used. Specific examples thereof preferably include diethylaluminum monochloride, diethylaluminum monobromide, diisobutylaluminum monochloride, dicyclohexylaluminum monochloride, diphenylaluminum monochloride, and diethylaluminum sesquichloride. The amount of such organic aluminum chloride to be used is preferably 0.1 mmol or more, 0.5 to 50 mmol per one mole of the total amount of 1,3-butadiene.

Then, a soluble cobalt compound as another one of the cis-1,4 polymerization catalysts is added to a mixture solution to which the organic aluminum chloride is preliminarily added, for the cis-1,4 polymerization of 1,3-butadiene. Such soluble cobalt compound includes those soluble in hydrocarbon-series solvents or liquid 1,3-butadiene to be used or uniformly dispersible ones therein, for example cobalt β-diketone complex, such as cobalt (II) acetylacetonate and cobalt (III) acetylacetonate, cobalt β-keto acid ester complex, such as cobalt acetoacetic acid ethyl ester complex, cobalt salts of organic carboxylic acids with 6 or more carbon atoms, such as cobalt octoate, cobalt naphthenate and cobalt benzoate, and halogenated cobalt complexes such as cobalt chloride pyridine complex and cobalt chloride ethyl alcohol complex. The amount of such soluble cobalt compound to be used is preferably 0.001 mmol or more, more preferably 0.005 mmol or more per one mole of 1,3-butadiene. The molar ratio (Al/Co) of an organic aluminum chloride to such soluble cobalt compound is 10 or more, particularly 50 or more. Still additionally, organic carboxylate salts of nickel, organic complex salts of nickel, organic lithium compounds, organic carboxylate salts of neodymium and organic complex salts of neodymium may also be used other than the soluble cobalt compound.

The temperature for the cis-1,4 polymerization is generally within a range of a temperature above 0° C. to 100° C., preferably 10 to 100° C., more preferably 20 to 100° C. Polymerization time (mean retention time) is preferably within a range of 10 minutes to 2 hours. The cis-1,4 polymerization is preferably done so that the polymer concentration after the cis-1,4 polymerization may be 5 to 26% by mass. As the polymerization tank, one tank or two or more tanks in conjugation are used. The polymerization is carried out while the solution is mixed together under agitation in the polymerization tank (polymerization apparatus). As the polymerization tank for use in polymerization, a polymerization tank equipped with an agitation unit for highly viscous solution, for example the apparatus described in JP-B-40-2645, can be used.

For the VCR production in accordance with the invention, known molecular weight adjusters, for example non-conjugated dienes such as cyclooctadiene, allene and methylallene (1,2-butadiene) or α-olefins such as ethylene, propylene and butene-1 can be used during the cis-1,4 polymerization. So as to further suppress gel generation during polymerization, known gelation-preventing agents can be used. Additionally, the content of the cis-1,4 structure in the polymerized product is generally 80% by mass or more, preferably 90% by mass or more, with ML10 to 50, preferably 10 to 40 and with substantially no content of gel matters.

1,3-Butadiene is 1,2 polymerized to produce VCR, by adding an organic aluminum compound represented by the general formula $AlR_3$ and carbon sulfide, and the soluble cobalt compound if necessary as the 1,2 polymerization catalyst, to the cis-1,4 polymerization mixture thus obtained. Then, the resulting 1,3-butadiene may be added to the polymerization mixture. Otherwise, the resulting 1,3-butadiene may not be added to the polymerization mixture but unreactive 1,3-butadiene may be reacted. The organic aluminum compound represented by the general formula $AlR_3$ preferably includes trimethylaluminum, triethylaluminum, triisobutylaluminum, tri(n-hexyl)aluminum and triphenylaluminum. The organic aluminum compound is at 0.1 mmol or more, particularly 0.5 to 50 mmol or more per one mole of 1,3-butadiene. Without specific limitation, carbon disulfide preferably never contains moisture. The concentration of carbon disulfide is 20 mmol/L or less, particularly preferably 0.01 to 10 mmol/L. As an alternative of carbon disulfide, known isothiocyanate phenyl and xanthogenic acid compounds may be used.

The temperature for the 1,2 polymerization is generally within a range of 0 to 100° C., preferably 10 to 100° C., more preferably 20 to 100° C. The yield of 1,2-polybutadiene can be raised during 1,2 polymerization, by adding one to 50 parts by mass, preferably one to 20 parts by mass of 1,3-butadiene per 100 parts by mass of the cis-1,4 polymerization mixture to the polymerization system for 1,2 polymerization. The polymerization time (mean retention time) is preferably within a range of 10 minutes to 2 hours. The 1,2 polymerization is preferably carried out so that the polymer concentration after the 1,2 polymerization might be 9 to 29% by mass. As the polymerization tank, one tank or two or more tanks in conjugation are used. The polymerization is carried out while the polymerization solution is mixed together under agitation in the polymerization tank (polymerization apparatus). As the polymerization tank for use in the 1,2 polymerization, a polymerization tank equipped with an agitation unit for highly viscous solution, for example the apparatus described in JP-B-40-2645, can be used, because the viscosity of the polymerization solution is increased during the 1,2 polymerization and the polymer apts to be attached.

For the VCR production in accordance with the invention, the process of producing VCR by the cis-1,4 polymerization and subsequent 1,2 polymerization as described above includes a step of adding a polymer substance of a low melting point and with at least one unsaturated double bond per repeating unit to the VCR production system. When the unsaturated polymer substance is added after VCR production, for example during compounding, the advantage of the invention cannot be obtained. The addition of such unsaturated polymer substance to a production system is preferably done into the polymerization mixture at an appropriate time point from the cis-1,4 polymerization to the 1,2 polymerization, more preferably at the time of the 1,2 polymerization.

The unsaturated polymer substance preferably is at least one selected from polyisoprene, crystallizable polybutadiene of a melting point less than 170° C., liquid polybutadiene, a polymeric compound containing oxygen bond, and derivatives thereof.

Polyisoprene includes for example general synthetic polyisoprene (cis-1,4-polyisoprene at a content of the cis structure of 90% by mass or more, etc.), liquid polyisoprene, and trans-polyisoprene.

The crystallizable polybutadiene of a melting point less than 170° C. is preferably a crystallizable polybutadiene of a melting point of 0° C. to 150° C., which includes for example 1,2-polybutadiene and trans-polybutadiene with low melting points.

The liquid polybutadiene includes for example polybutadiene with a very low molecular weight and with an intrinsic viscosity [η]=1 or less.

The polymeric compound containing oxygen bond is preferably compounds with ether group, epoxy group, carboxyl group, ester group, hydroxyl group and carbonyl group. Specific compounds thereof include for example phenol resin, nylon resin, polyurethane, polyethylene glycol, epoxylated polybutadiene, polyester, epoxylated styrene/butadiene copolymer, polyaryl ether, and allyl ether copolymer. By adding such polymeric compound containing oxygen bond to a polymerization system, the interface affinity changes between cis-polybutadiene as the matrix component of the vinyl•cis-polybutadiene rubber and the 1,2-polybutadiene crystal fiber, so that the mono-dispersion of the fiber crystal of the 1,2-polybutadiene crystal fiber and various properties of vinyl•cis-polybutadiene rubber can effectively be improved.

Additionally, the derivatives thereof include for example isopreneisobutylene copolymer, isoprenestyrene copolymer, styreneisoprenestyrene block copolymer, liquid epoxylated polybutadiene, liquid carboxyl-modified polybutadiene, and the like, and hydrogenated products of these derivatives.

Among the individual unsaturated polymer substances, preferably, isoprene, styreneisoprenestyrene block copolymer and 1,2-polybutadiene of a melting point of 70° C. to 110° C. are used. Additionally, the individual unsaturated polymer substances may be used singly or in mixture of two or more thereof.

When the unsaturated polymer substances as described above are added, the dispersibility of the 1,2-polybutadiene of a melting point of 170° C. or more in the cis-polybutadiene rubber as the matrix component can be prominently improved owing to the compatible effect of the unsaturated polymer substance in the resulting VCR, as described above, so that the characteristics of the resulting VCR are so excellent.

The amount of the unsaturated polymer substance to be added is within a range of preferably 0.01 to 50% by mass, more preferably 0.01 to 30% by mass to the obtained vinyl•cis-polybutadiene rubber. At any time point of addition, further, agitation is done for preferably 10 minutes to 3 hours, more preferably 10 minutes to 30 minutes after addition. In case of a polymeric compound containing oxygen bond, herein, the amount thereof to be added is within a range of preferably 0.01 to 20% by mass, more preferably 0.01 to 10% by mass to the obtained vinyl-cis-polybutadiene rubber. The method for addition in that case is with no specific limitation. During the c is 1,4 polymerization or 1,2 polymerization to produce vinyl-cis polybutadiene rubber, and/or at the termination of the polymerization of vinyl-cis polybutadiene rubber, the addition can satisfactorily be done. The addition at the time of 1,2 polymerization is preferable. After addition, preferably, agitation is done for 10 minutes to 3 hours. Preferably, agitation time is 10 minutes to 30 minutes.

In addition to the unsaturated polymer substance, an organic compound containing oxygen bond is preferably added. The organic compound containing oxygen bond preferably includes for example compounds with ether group, epoxy group, carboxyl group, ester group, hydroxyl group and carbonyl group, which includes for example acid anhydride, aliphatic alcohol, aromatic alcohol, aliphatic ether-aromatic ether, aliphatic carboxylic acid-aromatic carboxylic acid-unsaturated carboxylic acid, or aliphatic carboxylate ester-aromatic carboxylate ester-unsaturated carboxylate ester. The amount thereof to be added is within a range of preferably 0.01 to 20% by mass, more preferably 0.01 to 10% by mass to the obtained vinyl-cis-polybutadiene rubber. The method for addition in that case is with no specific limitation. During the cis 1,4 polymerization or 1,2 polymerization to produce vinyl-cis polybutadiene rubber, and/or at the termination of the polymerization of vinyl-cis polybutadiene rubber, the addition may satisfactorily be done. The addition at the time of 1,2 polymerization is preferable. After addition, preferably, agitation is done for 10 minutes to 3 hours. Preferably, agitation time is 10 minutes to 30 minutes.

After the polymerization reaches a predetermined polymerization ratio, known antioxidants are added according to general methods. Typical examples of such antioxidants include phenol-series 2,6-di-t-butyl-p-cresol (BHT), phosphorous-series trinonylphenyl phosphite (TNP), sulfur-series 4,6-bis(octylthiomethyl)-o-cresol, and dilauryl-3,3'-thiodipropionate (TPL). The antioxidants may be used singly or in combination of two or more thereof. The antioxidants are added to 0.001 to 5 parts by mass per 100 parts by mass of VCR. Subsequently, a polymerization-terminating agent is added to the polymerization system to terminate the polymerization. The method therefor includes for example known methods per se, such as a method of feeding a polymerization mixture after termination of the polymerization to a polymerization-terminating tank, and charging a large amount of a polar solvent such as alcohol such as methanol and ethanol and water in the polymerization mixture or introducing inorganic acids such as hydrochloric acid and sulfuric acid, organic acids such as acetic acid and benzoic acid, and hydrogen chloride gas to the polymerization mixture. Then, the generated VCR is separated and recovered, rinsed and dried according to general methods, to obtain the intended VCR.

The VCR of the invention thus obtained generally is at a ratio of the individual components, namely the ratio of 1,2-polybutadiene of a melting point of 170° C. or more, cis-polybutadiene rubber and the unsaturated polymer substance as described above, where 80% by mass of the microstructure of cis-polybutadiene rubber is cis-1,4-polybutadiene and the remaining thereof is trans-1,4-polybutadiene and vinyl-1,2-polybutadiene. The cis-polybutadiene and the unsaturated polymer substance are singly (namely, at unreactive states) soluble in boiling n-hexane, and the 1,2-polybutadiene of a melting point of 170° C. or more and the unsaturated polymer substance physically/chemically adsorbed are insoluble in boiling n-hexane (abbreviated as "H.I" hereinafter). The 1,2-polybutadiene of a melting point of 170° C. or more generally has a melting point of 170° C. to 220° C., and is a crystal fiber in short fiber as described above. Additionally, the ML of cis-polybutadiene rubber is 10 to 50, preferably 20 to 40 as described above.

Additionally, the VCR of the invention is composed of the 1,2-polybutadiene of a melting point of 170° C. or more and the unsaturated polymer substance dispersed uniformly in the matrix of cis-polybutadiene rubber.

Figure 2:
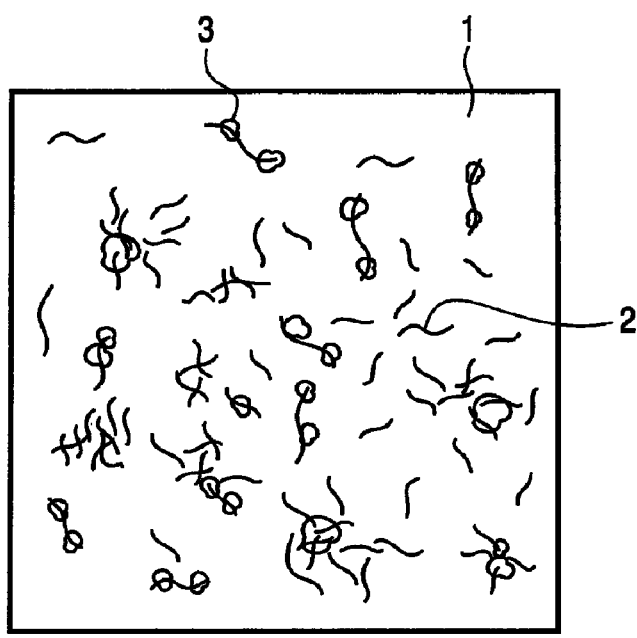
FIG. 2 is another schematic view of a dispersion embodiment of the unsaturated polymer substance in relation to the crystal fiber of the 1,2-polybutadiene of a melting point of 170° C. or more.
Figure 3:
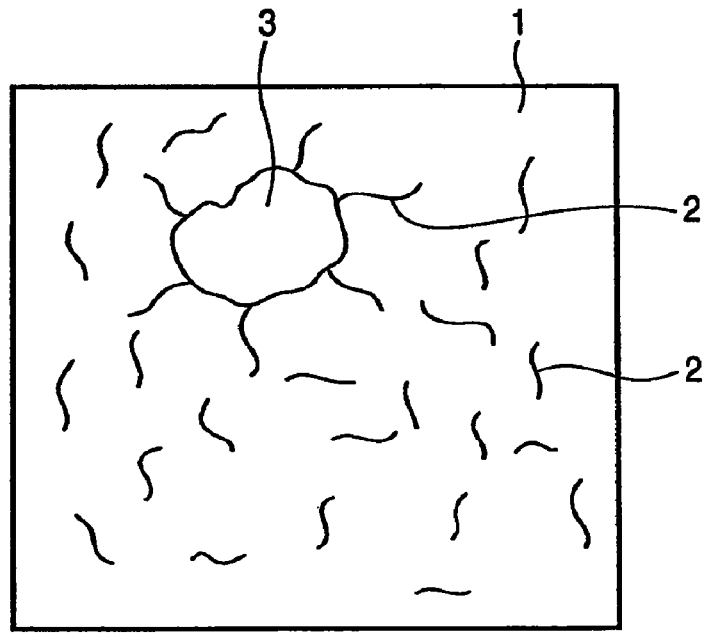
FIG. 3 is a still other schematic view of a dispersion embodiment of the unsaturated polymer substance in relation to the crystal fiber of the 1,2-polybutadiene of a melting point of 170° C. or more.
Figure 4:
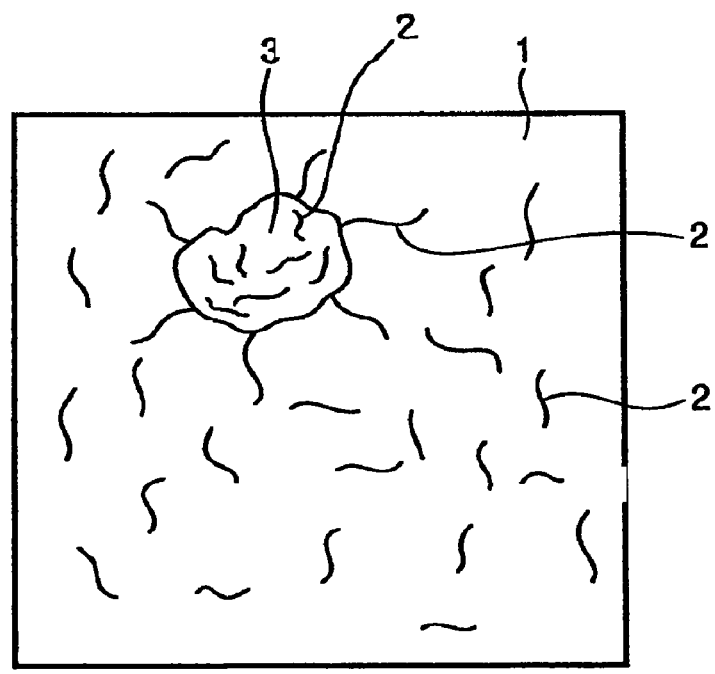
FIG. 4 is an additional schematic view of a dispersion embodiment of the unsaturated polymer substance in relation to the crystal fiber of the 1,2-polybutadiene of a melting point of 170° C. or more.

In the VCR of the invention, generally, the 1,2-polybutadiene of a melting point of 170° C. or more is dispersed in crystal fiber as described above. Additionally, the unsaturated polymer substance can be dispersed in various modes in association with the crystal fiber of the 1,2-polybutadiene of a melting point of 170° C. or more. As schematically shown in FIG. 1, the various modes include for example a mode of the crystal fiber "2" of the 1,2-polybutadiene of a melting point of 170° C. or more and the microparticle "3" of the unsaturated polymer substance separately dispersed in the matrix "1"; a mode of the microparticle "3" of the unsaturated polymer substance dispersed in a form being attached to the crystal fiber "2" of the 1,2-polybutadiene in the matrix "1" as schematically shown in FIG. 2; a mode of the crystal fiber "2" of the 1,2-polybutadiene dispersed in a form being attached to the microparticle "3" of the unsaturated polymer substance in the matrix "1" as schematically shown in FIG. 3; and a mode of the dispersion of the crystal fiber "2" of 1,2-polybutadiene in a state thereof included and dispersed in the microparticle "3" of the unsaturated polymer substance in the matrix "1" as schematically shown in FIG. 4. A mode in combination of two or more of the dispersion modes shown in FIGS. 1 through 4 may be possible. In FIGS. 1 through 4, "1" expresses matrix; "2", the crystal fiber of the 1,2-polybutadiene of a melting point of 170° C. or more; and "3", the microparticle of the unsaturated polymer substance.

By the method for producing VCR of the invention, the 1,3-butadiene and the hydrocarbon-series solvent substantially never containing carbon sulfide are recovered by separating and removing carbon disulfide from a mother solution of the polymerization mixture containing the unreactive 1,3-butadiene, the hydrocarbon-series solvent and carbon disulfide remaining after the separation and recovery of the generated VCR, generally by distillation to separate 1,3-butadiene and the hydrocarbon-series solvent or by adsorption and separation process of carbon disulfide or by separation process of carbon disulfide adducts. Additionally, the 1,3-butadiene and the hydrocarbon-series solvent substantially never containing carbon sulfide are recovered by recovering the three components from a mother solution of the polymerization mixture by distillation, and separating and removing carbon disulfide from the distillate by the adsorption and separation or the separation process of carbon disulfide adducts. The carbon disulfide and the hydrocarbon-series solvent recovered in the aforementioned manner are mixed with freshly fed 1,3-butadiene for recycling.

The mass average molecular weight of the boiling n-hexane-soluble matter on a polystyrene basis in the VCR of the invention is preferably 300,000 to 800,000, more preferably 300,000 to 600,000, for ready crystallization of the mono-dispersed fiber. The relation T-CP/ML between the toluene solution viscosity (T-CP) of the boiling n-hexane-soluble matter of VCR and the Mooney viscosity (ML) is preferably 1 or more, more preferably 1 to 4.

According to the VCR production method, the VCR of the invention can be produced continuously for a long period of time, industrially advantageously, at a high catalyst efficiency and with high processability of the catalyst component. Industrially advantageously at a high conversion ratio, the VCR can be continuously produced, particularly without any attachment to the inner wall or agitation wing inside the polymerization tank or to a part with a slow agitation.

The VCR of the invention is used singly for use as tire or is used therefor by being compounded with other synthetic rubber or natural rubber, extended with process oil if necessary and vulcanized with addition of fillers such as carbon black, vulcanizing agents, vulcanization-accelerators and other general compounding agents. With no specific limitation to any tire member, the VCR is used for side wall, or tread, stiffener, bead filler, inner liner, caucus, tire cord coating, and base tread. With no specific limitation to tire types, the VCR is used for highly rigid tire, vehicle tire, tires of large vehicles such as bus and truck, forklift tire, van-light truck tire, SUV (for use in 4×4) tire, motor cycle tire, stud-less tire, and radial tire. Additionally, the VCR is used for rubber uses toward which mechanical properties and abrasion resistance are demanded, such as hose, belt, golf ball, shoe sole, adhesive, antivibration rubber, soundproof material, other polymer-series complex materials, other various industrial articles and the like. Further, the VCR may be used as plastic modifiers.

Compositions prepared by adding the compounding agents to the VCR of the invention and kneading the resulting mixture together have lowered die swell ratios of 20 or less on an index basis, compared with VCR in the related art (lowered such value represents excellency) and have therefore very great extrusion processability.

Additionally, the VCR composition (compounded material) in accordance with the invention when vulcanized has got improved hardness and tensile stress. The VCR composition has particularly improved 100-% tensile stress and has the increase around 40 on an index basis compared with the VCR obtained by the methods of the related art (increased such value represents excellency) and a greatly improved reinforcing effect. Furthermore, the VCR composition has greatly improved flex-crack-growth resistance around 30 on an index basis (increased such value represents excellency) and exerts an effect of suppressing flex crack. Additionally, the permeability of gases such as oxygen as a thermo-resistant property demanded toward run flat tire and the like is lowered by around 5 (lower such value represents excellency) on an index basis, compared with the VCR obtained by methods of the related art, exerting an effect on the suppression of heat involved in oxidative deterioration.

For the exertion of the various physico-chemical properties, preferably, the 1,2-polybutadiene crystal fiber dispersed in VCR is partially dispersed in a mono-dispersed form as microfine crystal in the matrix of cis-polybutadiene rubber (abbreviated as "BR" hereinafter) and concurrently present with a large 1,2-polybutadiene crystal fiber with an aggregated structure. In other words, the mono-dispersed 1,2-polybutadiene crystal fiber in the BR matrix is preferably in a short fiber of the mean length of the mono-dispersed fiber crystal along short axis being 0.2 μm or less, an aspect ratio of 10 or less, the mean number of the mono-dispersed fiber crystal being 10 or more and a melting point of 170° C. or more. In addition to the 1,2-poybutadiene crystal fiber of a melting point of 170° C. or more, preferably, the unsaturated polymer substance is dispersed in the BR matrix. The unsaturated polymer substance preferably has high affinity with the 1,2-polybutadiene crystal fiber in the BR matrix, and is dispersed therein at a state of physical and chemical adsorption in the vicinity of the crystal fiber (dispersion modes of FIGS. 2 to 4). As described above, the concurrent dispersion of the 1,2-polybutadiene crystal fiber of a melting point of 170° C. or more and the unsaturated polymer substance in the BR matrix makes the various properties excellent, preferably.

A rubber composition prepared by compounding and compounding the VCR of the invention in other synthetic rubber or natural rubber is now described in detail. The rubber composition is suitably compounded with 10 to 300 parts, preferably 50 to 200 parts by mass of the VCR per 100 parts by mass of natural rubber, synthetic rubber or a blend rubber at an appropriate ratio thereof. The synthetic rubber preferably includes for example polyisoprene rubber and styrene-butadiene copolymer rubber. Additionally, a butadiene rubber composition for tire can preferably be produced, using the VCR and/or a butadiene rubber composition compounded with the VCR.

The rubber composition of the invention can be obtained by kneading the individual components using routine Banbury, open roll, kneader and biaxial kneader.

The rubber composition of the invention may be kneaded with compounding agents for routine use in rubber industries, such as vulcanizing agents, valcanization-accelerators, antioxidants, fillers, process oil, zinc oxide and stearic acid.

As the vulcanizing agents, known vulcanizing agents for example sulfur, organic peroxides, resin vulcanizing agents, and metal oxides such as magnesium oxide can be used.

As the valcanization-accelerators, known valcanization-accelerators for example aldehydes, ammonias, amines, guanidines, thioureas, thiazoles, thiurams, dithio-carbamates and xanthates can be used.

The antioxidants include for example amineetone series, imidazole series, amine series, phenol series, sulfur series and phosphorous series.

The fillers include for example inorganic fillers such as silicic anhydride, calcium carbonate, magnesium carbonate, talc, iron sulfide, iron oxide, bentonite, zinc oxide, diatomaceous earth, china clay, clay, alumina, titanium oxide, silica, and carbon black, and organic fillers such as regenerated rubber and powdery rubber.

As the process oil, any of aromatic series, naphthene series and paraffin series may be used.

EXAMPLES

Examples in accordance with the invention are now described specifically below.

Example 1

A solution of 1.6 kg of 1,3-butadiene dissolved in 18 kg of dehydrated cyclohexane was placed in a 30-L stainless steel-made reaction tank with an agitator after the inside was substituted with nitrogen gas, into which 4 mmol of cobalt octoate, 84 mmol of diethylaluminum chloride and 70 mmol of 1,5-cyclooctadiene were mixed, for agitation at 25° C. for 30 minutes for cis polymerization. The resulting polymer had ML of 33 and T-cp of 59, and a microstructure of 1,2 structure at 0.9% by mass, trans-1,4 structure at 0.9% by mass and cis-1,4 structure at 98.2% by mass. After the cis polymerization, an unsaturated polymer substance comprising polyisoprene (IR) (ML=87; cis-1,4 structure at 98% by mass) was added to the resulting polymerization solution to 5% by mass (as the percentage to the resulting vinyl•cis-polybutadiene rubber), for agitation at 25° C. for one hour. Immediately thereafter, 90 mmol of triethylaluminum and 50 mmol of carbon disulfide were added to the polymerization solution, for agitation at 25° C. for another 60 minutes, for 1,2 polymerization. After the completion of the polymerization, the resulting polymerization solution was added to 18 liters of methanol containing 4,6-bis(octylthiomethyl)-o-cresol at 1% by mass, for depositing and precipitating a rubber-like polymerized material, which was then separated and rinsed with methanol, and dried in vacuum at ambient temperature. The yield of the vinyl•cis-polybutadiene rubber thus obtained was 80%. Subsequently, the vinyl•cis-polybutadiene rubber was treated in boiling n-hexane, to separate insoluble matters and soluble matters, which were then dried. The polymer as a matter soluble in boiling n-hexane had ML of 31, T-cp of 57, and a T-cp/ML relation of about 1.8, where the micro structure was composed of 1.0% by mass of vinyl-1,2 structure, 0.9% by mass of trans-1,4 structure and 98.1% by mass of cis-1,4 structure. Additionally, the mass average molecular weight on a polystyrene basis was $42 \times 10^4$, with [η] of 1.7. The number of the mono-dispersed fiber crystal of 0.2 μm or less along short axis as contained in the vinyl•cis-polybutadiene rubber was 100 or more per 400 μm$^2$, while the aspect ratio was 10 or less and the melting point was 202° C.

The VCR rubber thus obtained was subjected to physicochemical assessment after the VCR rubber was compounded as shown below and in Table 1.

Assessment items and conditions for carrying out the assessment

Kneading Method

Kneading was done according to the following procedures.

[Primary Compounding]

Kneading apparatus: Banbury mixer (volume of 1.7 liters)

Rotation number: 77 rpm

Start temperature: 90° C.

Kneading procedures:

Time 0: charging VCR/NR (natural rubber)

Time 0: charging filler

Time 3 min: raising ram for cleaning (15 seconds)

Time 5 min: dump.

The dumped matter was continuously wound with a 10-inch roll for one minute, for round passing three times and subsequent sheet extrusion. After the compound was cooled for 2 hours or longer, the compound was subjected to secondary compounding according to the following procedures.

[Secondary Compounding]

After the completion of the primary compounding, secondary compounding was done according to the following procedures.

Kneading apparatus: 10-inch roll

Roll temperature: 40 to 50° C.

Rotation interval: 2 mm

Kneading procedures:

(1) Time 0: winding dumped matter and charging sulfur and vulcanization-accelerator (2) Time 2 min: cutting (3) Time 3 min: sheet extrusion after corner scraping and round passing Time period for vulcanization Measuring apparatus: JSR curelastometer type 2F Measuring temperature: 150° C.

Measuring time period: vulcanization time periods of $t_{90} \times 2$ and $t_{90} \times 3$ Vulcanization conditions Vulcanizing apparatus: press vulcanization Vulcanizing temperature: 150° C.

[Assessment of Physico-Chemical Properties of Raw Rubber]

The microstructure was analyzed by infrared absorption spectrometry. Based on the absorption intensity ratio at 740 $cm^{-1}$ for cis, 967 $cm^{-1}$ for trans and 910 $cm^{-1}$ for vinyl, the microstructure was calculated.

The Mooney viscosity ($ML_{1+4}$) was measured according to JIS K6300.

The viscosity in toluene solution (Tcp) was measured at 25° C., by dissolving 2.28 g of polymer in 50 ml of toluene and using the standard solution for calibrating viscometer (JIS Z8809) as the standard solution and Canon Fenske viscometer No. 400.

$M_{100}$: tensile stress value when a sample of vulcanized rubber exerted an extension ratio of 100%, as measured according to JIS K6301.

$T_B$: tensile strength at break of a sample of vulcanized rubber, as measured according to JIS K6301.

The melting point of the 1,2-polybutadiene crystal fiber was determined on the basis of the peak point on endothermic curve with differential scanning calorimeter (DSC).

[Physico-Chemical Properties of Compounded Material]

Die swell

Measuring apparatus: apparatus for measuring processability as manufactured by Monsanto (MPT)

Die shape: circle

L/D: 1, 10 (D=1.5 mm)

Measuring temperature: 100° C.

Shear velocity: 100 $sec^{-1}$

[Physico-Chemical Properties of Vulcanized Product]

Hardness, rebound resilience and tensile strength were measured according to measuring methods defined by JIS-K-6301.

The tan δ of dynamic visco-elasticity was measured under conditions of a temperature of 70° C., a frequency of 10 Hz and a dynamic strain of 2%, using RSA2 manufactured by Reometrics Far East LTD.

Exothermic property and PS (permanent strain) were measured under conditions of a strain of 0.175 inch, a load of 55 ponds, 100° C. and 25 minutes with Goodrich flexometer according to ASTM D623.

The compressed permanent strain was measured by compression under conditions of a temperature of 70° C. and 22 hours with a compression set tester manufactured by Ueshima Seisakusho Co., Ltd. according to JIS K6301 or ASTM D395.

As the flex-crack-growth resistance, a number of flexing a sample until the crack of the sample reached a length of 15 mm or more with a flexing machine manufactured by Ueshima Seisakusho Co., Ltd. according to ASTM D813 was measured.

The gas permeability was measured according to the measuring method defined by JIS K7126.

The tan δ of the dynamic visco-elasticity was measured under conditions of a temperature of 70° C., a frequency of 10 Hz and a dynamic strain of 2% using RSA2 manufactured by Rheometrics Far East LTd.

TABLE 1

| | Rubber & chemicals | Compounded amount (phr) |
|---|---|---|
| Primary compounding | VCR/NR | 60/40 |
| | HAF carbon | 50 |
| | Process oil | 10 |
| | Zinc oxide No. 1 | 5 |
| | Stearic acid | 2 |
| | Antioxidant AS | 1 |
| Secondary compounding | Vulcanization-accelarator CZ | 1 |
| | Sulfur | 1.5 |
| | Total | 170.5 |

Example 2

Vinyl·cis-polybutadiene rubber was obtained in the same manner as in Example 1 except for the use of unsaturated polymer substances (additives) to be added as shown in Table 2.

Comparative Examples 1 through 4

Synthesis and compounding were done in the same manner as in Example 1 except for no addition of unsaturated polymer substance (additive), or except for the addition of unsaturated polymer substance not during polymerization but during compounding after VCR rubber synthesis (the amount of unsaturated polymer substance to be added was 10% by mass of VCR).

Table 2 shows the raw rubber data of vinyl·cis-polybutadiene rubber compositions. In the table, the number of mono-dispersed fiber crystal was the number per 400 $\mu m^2$ as an index while such crystal of a length of 0.2μ or less along short axis was defined as mono-dispersed SPB fiber crystal.

The microstructure of highly melting SPB in Comparative Example 1 was at 98.8% by mass of vinyl-1,2 structure, 0.6% by mass of trans-1,4 structure, 0.6% by mass of cis-1,4 structure and a ratio (A/B) between (A) matrix BR as a matter soluble in boiling n-hexane and (B) highly melting SPB as a matter insoluble in boiling n-hexane was 88/12. In Comparative Example 1, additionally, ηsp/c of the polymer insoluble in boiling n-hexane was 1.5. (ηsp/c: expressing the magnitude of the molecular weight of 1,2-polybutadiene crystal fiber; measured at a temperature of 135° C.; and the solvent used was o-dichlorobenzene).

In the table, IR represents IR2200 (polyisoprene manufactured by JSR); 1,2-PB represents RB820 (1,2-polybutadiene manufactured by JSR).

TABLE 2

| | Polymer substance Type (melting point) | Polymer substance Time for addition (amount added in wt %) | Polymerization solvent (sp value) | Mono-dispersed SPB Fiber crystal number (crystals/ 400 μm²) | Mono-dispersed SPB Aspect ratio | Mono-dispersed SPB Shape | H.I (wt %) | Crystal fiber diameter along major axis In matrix (μm) | Crystal fiber diameter along major axis In polymer substance (μm) |
|---|---|---|---|---|---|---|---|---|---|
| Example 1 | IR | At the time of polymerization (10) | Cyclo-hexane (8.1) | 100 or more | 10 or less | Particle | 22.4 | 0.2 to 0.5 | 0.1 or less |

TABLE 2-continued

|  | Polymer substance Type (melting point) | Polymer substance Time for addition (amount added in wt %) | Polymerization solvent (sp value) | Mono-dispersed SPB Fiber crystal number (crystals/ 400 μm²) | Mono-dispersed SPB Aspect ratio | Mono-dispersed SPB Shape | H.I (wt %) | Crystal fiber diameter along major axis In matrix (μm) | Crystal fiber diameter along major axis In polymer substance (μm) |
|---|---|---|---|---|---|---|---|---|---|
| Example 2 | 1,2-PB (90° C.) | At the time of polymerization (10) | Cyclohexane (8.1) | 20 | 10 or less | Fiber and particle | 22.3 | 0.5 to 1 | 0.1 or less |
| Comparative Example 1 | — | — | Cyclohexane (8.1) | 4 | 20 or more | Fiber | 12.1 | 1 or more | None |
| Comparative Example 2 | IR | At the time of compounding (10) | Cyclohexane (8.1) | 4 | 20 or more | Fiber | 12.3 | 1 or more | 0.5 or more |

Examples 3 through 12 and Comparative Examples 3 through 5

Vinyl·cis-polybutadiene rubber was obtained in the same manner as in Example 1, except for the addition of polymer substances and solvents shown in Table 3.

In the table, IR represents IR2200 (polyisoprene manufactured by JSR); liquid PB is Hiker CTBN 1300×8 (liquid polybutadiene with a molecular weight of 3,500 as manufactured by Ube Industries, Ltd.); epoxylated PB represents Epolead PB3600 (epoxylated polybutadiene with a viscosity of 33 pascal seconds at 45° C. as manufactured by Daicel Chemical Industries, Ltd.); aryl ether polymer is Maryarim AWS-0851 (viscosity of 400 stokes at 100° C. as manufactured by NOF Corporation).

TABLE 3

|  | Polymer substance | | | Mono-dispersed SPB | |
|---|---|---|---|---|---|
|  | Type (melting point) | Time for addition (amount added in wt %) | Polymerization solvent (SP value) | Fiber crystal number (crystals/ 400 μm²) | Aspect ratio |
| Example 3 | IR | At polymerization (5) | Cyclohexane (8.1) | 100 or more | 10 or less |
| Example 4 | Liquid PB | At polymerization (1) | Cyclohexane (8.1) | 29 | 10 or less |
| Example 5 | Epoxylated PB | At polymerization (0.5) | Cyclohexane (8.1) | 100 or more | 7 |
| Example 6 | Epoxylated PB | At polymerization (0.5) | Cyclohexane/benzene = 80/20 (8.3) | 60 or more | 7 |
| Example 7 | Epoxylated PB | At polymerization (0.5) | Cyclohexane/benzene = 60/40 (8.5) | 30 or more | 9 |
| Example 8 | Allyl ether copolymer | At polymerization (1) | Cyclohexane (8.1) | 16 | 8 |
| Example 9 | Epoxylated PB | At polymerization (1) | n-Hexane (7.2) | 20 | 10 |
| Example 10 | Epoxylated PB | At polymerization (5) | Cyclohexane (8.1) | 29 | 9 |
| Example 11 | Epoxylated PB | At polymerization (0.5) | Cyclohexane/n-hexane = 50/50 (7.7) | 100 or more | 10 or less |
| Example 12 | Allyl ether copolymer | At polymerization (0.5) | Cyclohexane/n-hexane = 50/50 (7.7) | 20 or more | 8 or less |
| Comparative Example 3 | — | — | Cyclohexane/benzene = 80/20 (8.3) | 8 | 11 |
| Comparative Example 4 | — | — | Cyclohexane (8.1) | 4 | 13 |
| Comparative Example 5 | — | — | Cyclohexane/n-hexane = 50/50 (7.7) | 2 | 12 |

Data of products compounded with vinyl·cis-polybutadiene rubber compositions and vulcanized products thereof are shown below. In Examples 8 through 12 and Comparative Examples 4 and 5, herein, VCR/NR=100/0, representing that NR (natural rubber) was not added during the primary compounding, for compounding.

Smaller indices of Die swell (100 $sec^{-1}$), gas permeability, exothermic property, PS, compressed permanent strain and tanδ show better excellency.

Larger indices of hardness, M100, TB, EB, TR, Ranborn abrasion, flex-crack-growth resistance and rebound resilience show better excellency.

TABLE 4

|  | Example 1 | Example 2 | Example 3 | Example 4 | Comparative Example 1 | Comparative Example 2 |
|---|---|---|---|---|---|---|
| Physico-chemical properties of compounded material (index) | | | | | | |
| Die swell 100 $sec^{-1}$ | L/D = 1  70 | L/D = 1  72 | L/D = 1  76 | L/D = 1  85 | L/D = 1  100 | L/D = 1  99 |
| Physico-chemical properties of vulcanized product (index) | | | | | | |
| Hardness | 106 | 107 | 104 | 106 | 100 | 100 |
| M100 | 140 | 139 | 138 | 136 | 100 | 101 |
| TB | 107 | 107 | 104 | 107 | 100 | 100 |
| EB | 102 | 100 | 101 | 100 | 100 | 100 |
| TR | 103 | 103 | 104 | 103 | 100 | 101 |
| Ranborn abrasion (slip ratio: 20%) | 112 | 109 | 108 | 100 | 100 | 99 |
| Flex-crack-growth resistance | 135 | 130 | 136 | 131 | 100 | 104 |
| Gas permeability of $N_2$ | 95 | 95 | 95 | 95 | 100 | 100 |
| Gas permeability of $O_2$ | 93 | 92 | 93 | 92 | 100 | 100 |
| Rebound resilience | 105 | 104 | 105 | 103 | 100 | 101 |
| Exothermic properties | 87 | 88 | 88 | 89 | 100 | 96 |
| PS | 82 | 83 | 83 | 84 | 100 | 96 |
| Compressed permanent strain | 89 | 88 | 88 | 89 | 100 | 98 |
| tanδ | 86 | 85 | 83 | 84 | 100 | 98 |

TABLE 5

|  | Example 5 | Example 6 | Example 7 | Comparative Example 3 |
|---|---|---|---|---|
| Physico-chemical properties of compounded material (index) | | | | |
| Die swell 100 $sec^{-1}$ | L/D = 1  77 | L/D = 1  78 | L/D = 1  80 | L/D = 1  100 |
| Physico-chemical properties of vulcanized product (index) | | | | |
| Hardness | 104 | 104 | 104 | 100 |
| M100 | 141 | 140 | 140 | 100 |
| TB | 107 | 107 | 106 | 100 |
| EB | 102 | 102 | 102 | 100 |
| TR | 103 | 103 | 102 | 100 |
| Ranborn abrasion (slip ratio: 20%) | 112 | 112 | 109 | 100 |
| Flex-crack-growth resistance | 143 | 139 | 139 | 100 |
| Gas permeability of $N_2$ | 95 | 95 | 95 | 100 |
| Gas permeability of $O_2$ | 93 | 93 | 93 | 100 |
| Rebound resilience | 105 | 105 | 104 | 100 |
| Exothermic properties | 88 | 89 | 91 | 95 |
| PS | 82 | 81 | 83 | 94 |
| Compressed permanent strain | 88 | 89 | 89 | 96 |
| tanδ | 86 | 87 | 86 | 93 |

TABLE 6

| | Example 8 | Example 9 | Example 10 | Comparative Example 4 |
|---|---|---|---|---|
| Physico-chemical properties of compounded material (index) | | | | |
| Die swell | L/D = 1 | L/D = 1 | L/D = 1 | L/D = 1 |
| 100 sec$^{-1}$ | 73 | 71 | 75 | 100 |
| Physico-chemical properties of vulcanized product (index) | | | | |
| Hardness | 107 | 107 | 106 | 100 |
| M100 | 138 | 139 | 140 | 100 |
| TB | 107 | 107 | 107 | 100 |
| EB | 102 | 100 | 100 | 100 |
| TR | 104 | 103 | 103 | 100 |
| Ranborn abrasion (slip ratio: 20%) | 105 | 106 | 106 | 100 |
| Flex-crack-growth resistance | 135 | 129 | 132 | 100 |
| Gas permeability of $N_2$ | 95 | 95 | 96 | 100 |
| Gas permeability of $O_2$ | 93 | 92 | 94 | 100 |
| Rebound resilience | 103 | 104 | 105 | 100 |
| Exothermic properties | 90 | 91 | 89 | 100 |
| PS | 82 | 83 | 82 | 100 |
| Compressed permanent strain | 86 | 87 | 87 | 100 |
| Tanδ | 86 | 83 | 84 | 100 |

TABLE 7

| | Example 11 | Example 12 | Comparative Example 5 |
|---|---|---|---|
| Physico-chemical properties of compounded material (index) | | | |
| Die swell | L/D = 1 | L/D = 1 | L/D = 1 |
| 100 sec$^{-1}$ | 70 | 73 | 100 |
| Physico-chemical properties of vulcanized product (index) | | | |
| Hardness | 107 | 107 | 100 |
| M100 | 141 | 138 | 100 |
| TB | 109 | 107 | 100 |
| EB | 101 | 102 | 100 |
| TR | 104 | 104 | 100 |
| Ranborn abrasion (slip ratio: 20%) | 109 | 111 | 100 |
| Flex-crack-growth resistance | 133 | 135 | 100 |
| Gas permeability of $N_2$ | 95 | 95 | 100 |
| Gas permeability of $O_2$ | 93 | 93 | 100 |
| Rebound resilience | 108 | 107 | 100 |
| Exothermic properties | 86 | 86 | 100 |
| PS | 79 | 78 | 100 |
| Compressed permanent strain | 85 | 87 | 100 |
| Tanδ | 80 | 78 | 100 |

Figure 5:
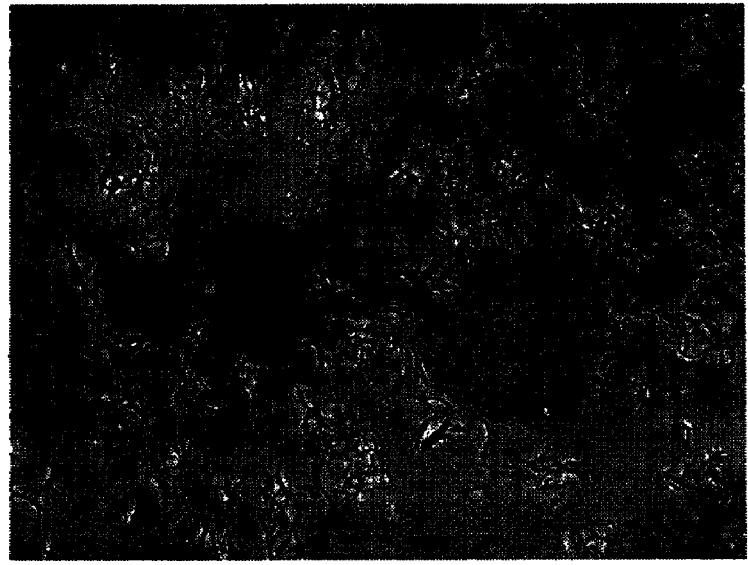
FIG. 5 is an electron micrograph depicting the microstructure of the vinyl•cis-polybutadiene rubber obtained in Comparative Example 1.
Figure 6:
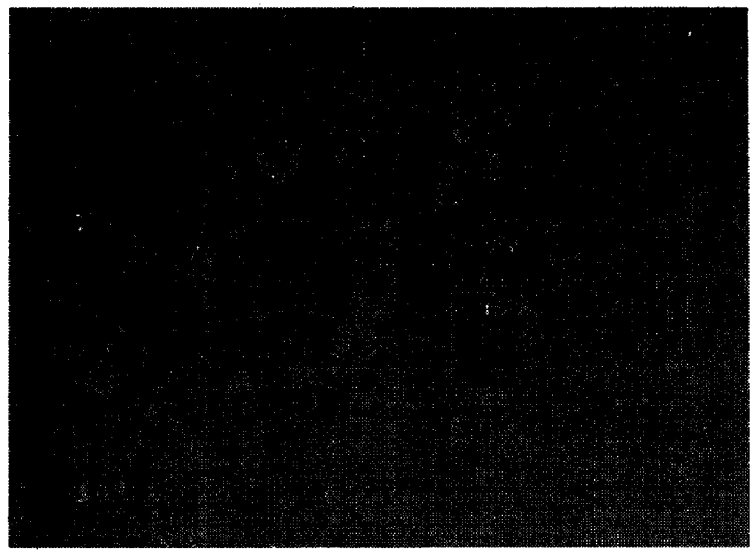
FIG. 6 is an electron micrograph depicting the microstructure of the vinyl•cis-polybutadiene rubber obtained in Example 1.
Figure 7:
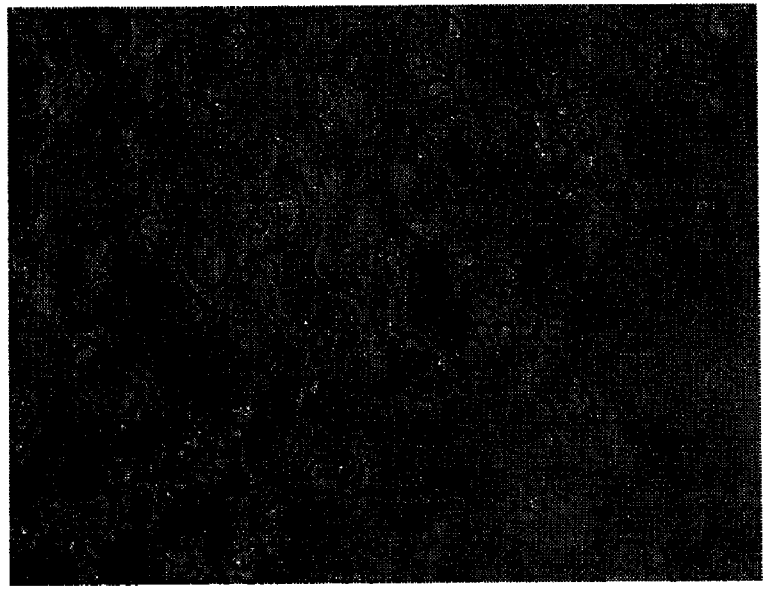
FIG. 7 is an electron micrograph depicting the microstructure of the vinyl•cis-polybutadiene rubber obtained in Example 3.
Figure 8:
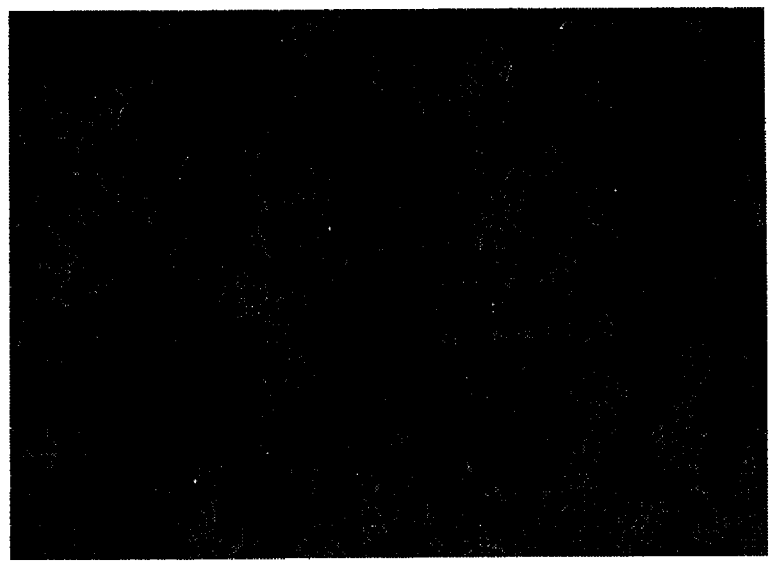
FIG. 8 is an electron micrograph depicting the microstructure of the vinyl•cis-polybutadiene rubber obtained in Example 4.

FIGS. 5 through 8 are electron micrographs depicting the microstructures of vinyl•cis-polybutadiene rubber actually obtained. FIG. 5 is the micrograph of Comparative Example 1, where 1,2-polybutadiene of a melting point of 170° C. or more is a whisker-like crystal to form aggregation in the matrix. FIG. 6 is the micrograph of Example 3; FIG. 7 is the micrograph of Example 2; and FIG. 8 is the micrograph of Example 4, where the aggregation formed by whisker-like crystals in the individual figures is small compared with FIG. 5, indicating better dispersion.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing vinyl•cis-polybutadiene rubber by a step of cis-1,4 polymerization of 1,3-butadiene using a cis-1,4 polymerization catalyst in a hydrocarbon-series solvent to obtain a first polymerization mixture, a step of 1,2 polymerization of 1,3-butadiene in the concurrent presence of a 1,2 polymerization catalyst in the first polymerization mixture to generate a second polymerization mixture including 1,2-polybutadiene having a melting point of 170° C. or more, and a step of separation and recovery of vinyl•cis-polybutadiene rubber generated from the second polymerization mixture, the method further including a step of adding a polymer substance with at least one unsaturated double bond per repeating unit to the production system of vinyl•cis-polybutadiene rubber, wherein the polymer substance comprises at least one selected from the group consisting of polyisoprene, crystallizable polybutadiene having a melting point less than 170° C., liquid polybutadiene, a polymeric compound containing an ether group, an epoxy group, a carboxyl group, an ester group, a hydroxyl group, or a carbonyl group, and derivatives of the polymer substance thereof.

2. The method for producing vinyl•cis-polybutadiene rubber according to claim 1, where the polymer substance comprises at least one selected from the group consisting of polyisoprene, crystallizable polybutadiene having a melting point of 0° C. to 150° C., liquid polybutadiene, and derivatives thereof.

3. The method for producing vinyl•cis-polybutadiene rubber according to claim 1, where the amount of the polymer substance to be added to the production system is within a range of 0.01 to 50% by mass to the vinyl•cis-polybutadiene rubber to be obtained.

4. The method for producing vinyl•cis-polybutadiene rubber according to claim 1, wherein the step of adding the polymer substance to the production system comprises adding the polymer substance appropriate time point from the step of the cis-1,4 polymerization to the step of the separation and recovery of the vinyl•cis-polybutadiene rubber generated from the second polymerization mixture obtained after the completion of the 1,2 polymerization.

5. The method for producing vinyl•cis-polybutadiene rubber according to claim 1, where the hydrocarbon-series solvent is a hydrocarbon-series solvent with a solubility parameter of 9.0 or less.

6. A butadiene rubber composition prepared by compounding the vinyl•cis-polybutadiene rubber obtained by a production method according to claims 1 at 10 to 300 parts by mass per 100 parts by mass of a rubber selected from natural rubber, polyisoprene rubber, styrene-butadiene copolymer rubber or a blend rubber of at least two types thereof.

7. A butadiene rubber composition for tire, comprising the vinyl•cis-polybutadiene rubber obtained by a production method according to claim 1.

8. A butadiene rubber composition for tire, where the vinyl•cis-polybutadiene rubber obtained by a production method according to claim 1 is used at 10 to 300 parts by weight per 100 parts by weight of a rubber selected from natural rubber, polyisoprene rubber, styrene-butadiene copolymer, rubber, or a blend rubber of at least two types thereof.

* * * * *